(12) United States Patent
Lai

(10) Patent No.: US 10,191,251 B2
(45) Date of Patent: Jan. 29, 2019

(54) OPTICAL LENS

(71) Applicant: Rays Optics Inc., Hukou Township, Hsinchu County (TW)

(72) Inventor: Sheng-Tang Lai, Hukou Township, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 49 days.

(21) Appl. No.: 15/235,583

(22) Filed: Aug. 12, 2016

(65) Prior Publication Data

US 2018/0045922 A1 Feb. 15, 2018

(51) Int. Cl.
*G02B 5/00* (2006.01)
*G02B 9/60* (2006.01)
*G02B 13/00* (2006.01)
*G02B 27/00* (2006.01)
*G02B 27/42* (2006.01)

(52) U.S. Cl.
CPC ......... *G02B 13/0055* (2013.01); *G02B 5/005* (2013.01); *G02B 9/60* (2013.01); *G02B 13/0045* (2013.01); *G02B 27/0037* (2013.01); *G02B 27/4211* (2013.01)

(58) Field of Classification Search
CPC ... G02B 9/00; G02B 9/04; G02B 9/10; G02B 9/12; G02B 9/34; G02B 9/58; G02B 9/60; G02B 9/62; G02B 9/64; G02B 13/001; G02B 13/0015; G02B 13/0055; G02B 13/006; G02B 13/18; G02B 27/0037; G02B 27/4211; G02B 5/005; G02B 13/0045; H01L 27/14625

USPC .......................................................... 359/691
See application file for complete search history.

(56) References Cited

U.S. PATENT DOCUMENTS

| | | | |
|---|---|---|---|
| 7,023,628 B1 | 4/2006 | Ning | |
| 7,286,302 B2 | 10/2007 | Ohzawa et al. | |
| 7,298,561 B1 | 11/2007 | Yamashita et al. | |
| 7,933,078 B2 | 4/2011 | Jung et al. | |
| 9,116,330 B2 | 8/2015 | Abe | |
| 2005/0207023 A1* | 9/2005 | Suzuki | G02B 15/177 359/680 |
| 2011/0134537 A1* | 6/2011 | Muratani | G02B 15/177 359/680 |
| 2012/0229693 A1* | 9/2012 | Matsumura | G02B 13/18 348/345 |

* cited by examiner

*Primary Examiner* — Kimberly N. Kakalec
(74) *Attorney, Agent, or Firm* — Muncy, Geissler, Olds & Lowe, P.C.

(57) ABSTRACT

An optical lens includes a first lens group with negative refractive power, a second lens group with positive refractive power, and an aperture stop disposed between the first lens group and the second lens group. A number of lenses with refractive power of the first lens group is smaller than three, and a number of lenses with refractive power of the second lens group is smaller than five. The second lens group has a lens with a diffractive optical surface, and the lens with a diffractive optical surface satisfies the condition: $0<|(\Phi d*V)/\Phi r|<2$, where $\Phi d$ denotes refractive power of the diffractive optical surface, $\Phi r$ denotes refractive power of the lens, and V denotes an Abbe number of the lens with a diffractive optical surface.

20 Claims, 10 Drawing Sheets

OPTICAL LENS

BACKGROUND OF THE INVENTION a. Field of the Invention

The invention relates generally to an optical lens, and more particularly to an optical lens having a diffractive optical element and 24-hours confocal image-capturing capability b. Description of the Related Art

Nowadays, as smart home surveillance cameras become more immersed in user's everyday lives, there is a growing need for these devices to become thinner and have high optical performance. To meet these requirements, an optical lens needs to have low fabrication costs, large aperture, wide viewing angles, light weight and 24-hours confocal image-capturing capability. Therefore, it is desirable to provide an optical lens that may achieve lighter weight, lower fabrication costs, good imaging quality and 24-hours confocal image-capturing capability.

BRIEF SUMMARY OF THE INVENTION

According to one aspect of the present disclosure, an optical lens includes a first lens group with negative refractive power, a second lens group with positive refractive power, and an aperture stop disposed between the first lens group and the second lens group. A number of lenses with refractive power of the first lens group is smaller than three, and a number of lenses with refractive power of the second lens group is smaller than five. The second lens group has a lens with a diffractive optical surface, and the lens with a diffractive optical surface satisfies the condition: $0<|(\Phi d*V)/\Phi r|<2$, where $\Phi d$ denotes refractive power of the diffractive optical surface, $\Phi r$ denotes refractive power of the lens, and V denotes an Abbe number of the lens with a diffractive optical surface.

According to the above embodiment, the optical lens may achieve lighter weight, lower fabrication costs, good imaging quality and 24-hours confocal image-capturing capability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 and FIG. 3 are ray fan plots of the optical lens of FIG. 1 respectively for visible light and 850 nm infrared light. FIG. 4 depicts a diffractive MTF curve for 587 nm green light, and FIG. 5 depicts a diffractive MTF curve for 850 nm infrared light.

FIG. 7 and FIG. 8 are ray fan plots of the optical lens of FIG. 6 respectively for visible light and 850 nm infrared light. FIG. 9 depicts a diffractive MTF curve for 587 nm green light, and FIG. 10 depicts a diffractive MTF curve for 850 nm infrared light.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
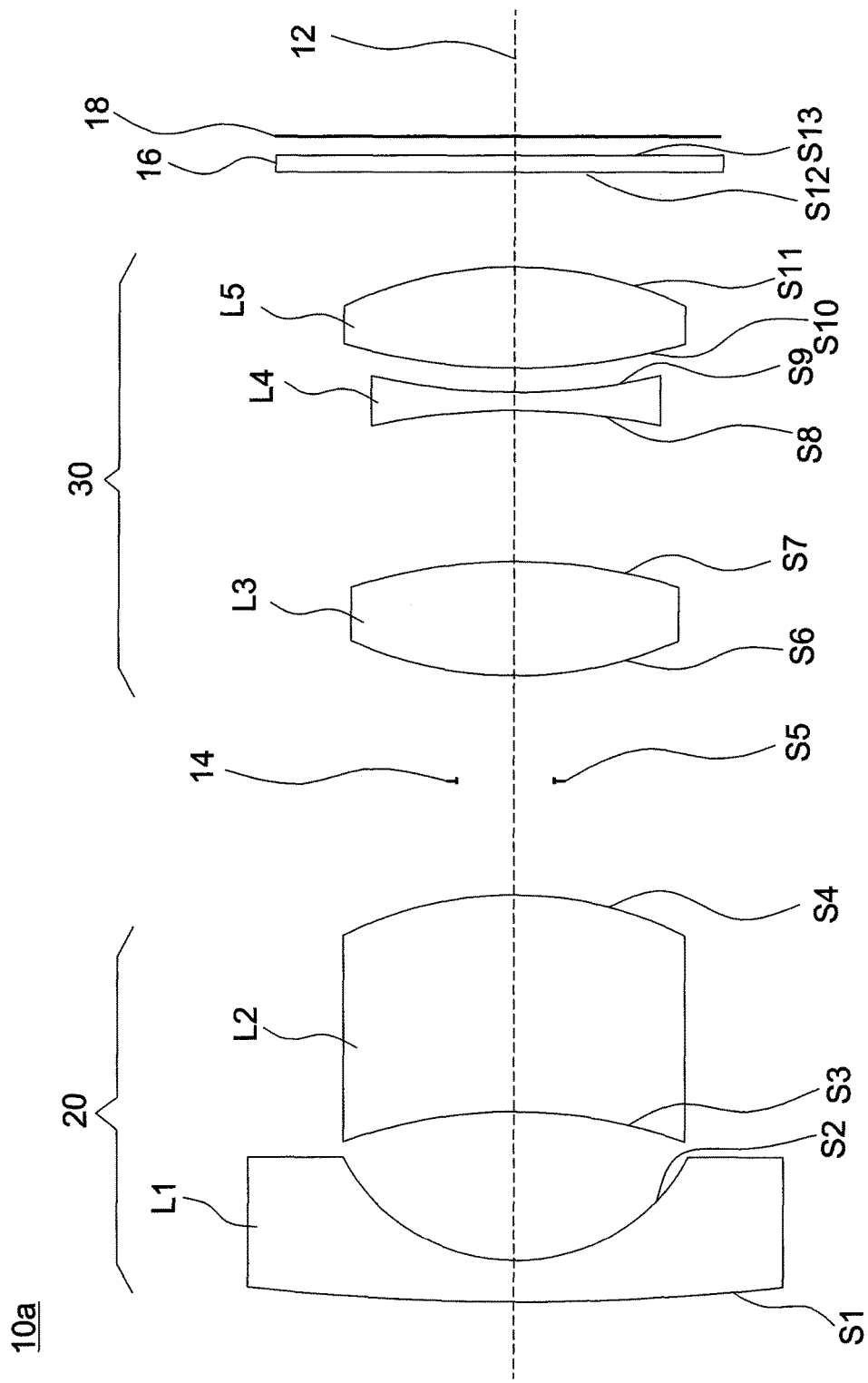
FIG. 1 shows a schematic diagram illustrating an optical lens according to an embodiment of the invention.

FIG. 1 shows a schematic diagram illustrating an optical lens according to an embodiment of the invention. An optical lens 10a is disposed between a magnified side (such as an object side on the left of FIG. 1) and a minified side (such as an image side on the right of FIG. 1). As shown in FIG. 1, the optical lens 10a may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18 formed at an effective focal length (EFL) for visible light of the optical lens 10a. The cover glass 16 is disposed between the second lens group 30 and the image plane 18 for visible light. The first lens group 20 may include a first lens L1 and a second lens L2 arranged in order, along an optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to the fifth lens L5 are negative, positive, positive, negative and positive. In this embodiment, the fourth lens L4 is an aspheric lens with a diffractive optical surface, the first lens L1, the second lens L2 and the fifth lens L5 are aspheric lenses, and the third lens L3 is a bi-convex lens. Further, the first lens L1 to the fifth lens L5 are separate from each other. In an alternate embodiment, adjoining surfaces respectively on adjacent lenses may have an identical radius of curvature and may be joined together to form a cemented lens, but the invention is not limited thereto. The detailed optical data of the optical lens 10a such as lens parameters, shape, aspheric coefficients and diffractive coefficients are shown in Tables 1-3 below. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + \ldots, \quad (1)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-D shown in Table 2 are 4th, 6th, 8th and 10th order aspheric coefficients. In the following design examples of the invention, a diffractive optical surface polynomial may be expressed as the following:

$$\phi(r) = (2\pi/\lambda_0)\Sigma C_n r^{2n} \quad (2)$$

where (r) denotes a phase function of a diffractive optical element, r denotes a radial distance relative to the optical axis of the optical lens, and $\lambda_0$ denotes a reference wavelength. That is, a diffractive optical surface is a lens surface that possesses a diffractive phase function. Parameters C1 and C2 shown in Table 3 are 2th and 4th order coefficients of the diffractive optical surface polynomial.

TABLE 1

| Surface | Radius (mm) | Thickness (mm) | Refractive index | Abbe number | Object description |
|---|---|---|---|---|---|
| S1 | 82.442 | 0.751 | 1.53 | 55.75 | L1(aspheric) |
| S2 | 3.017 | 2.392 | | | |
| S3 | −7.580 | 3.433 | 1.64 | 23.97 | L2(aspheric) |
| S4 | −6.391 | 1.889 | | | |
| S5 | ∞ | 1.688 | | | aperture stop |
| S6 | 6.640 | 1.763 | 1.44 | 94.95 | L3(biconvex) |
| S7 | −7.810 | 2.462 | | | |
| S8 | −9.774 | 0.300 | 1.64 | 23.97 | L4(aspheric) |
| S9 | 9.104 | 0.450 | | | |
| S10 | 6.431 | 1.531 | 1.53 | 55.75 | L5(aspheric) |
| S11 | −6.024 | 6.186 | | | |
| S12 | ∞ | 0.610 | 1.52 | 64.17 | cover glass |
| S13 | ∞ | 0.049 | | | |
| | ∞ | | | | image plane |

Effective focal length (EFL) for visible light = 3.984 mm
Effective focal length (EFL) for NIR 850 nm light = 3.981 mm
F-Number = 2.0
Maximum field of view (FOV) = 103.2 degrees
Maximum image circle (IMA) of the visible light image plane = 7.54 mm
Total track length TTL (distance between the surface S1 and the image plane) = 23.5 mm In the above Table 1, the field heading "thickness" represents a distance of two adjacent surfaces along the optical axis 12. For example, a thickness of the surface S1 is a distance between the surface S1 and the surface S2 along the optical axis 12, a thickness of the surface S2 is a distance between the surface S2 and the surface S3 along the optical axis 12, and a thickness of the surface S13 is a distance between the surface S13 of the cover glass 16 and the image plane 18 along the optical axis 12.

TABLE 2

| | S1 | S2 | S3 | S4 |
|---|---|---|---|---|
| K | 0 | 0 | 0 | 0 |
| A | 1.031E−03 | −5.591E−04 | −1.937E−03 | −8.18E−05 |
| B | −8.090E−05 | −1.908E−04 | 9.177E−06 | 3.206E−06 |
| C | 4.695E−06 | −1.152E−05 | −1.122E−05 | 4.662E−06 |
| D | −9.313E−08 | −1.412E−06 | 1.830E−06 | −2.115E−07 |
| | S8 | S9 | S10 | S11 |
| K | 6.593E+00 | −6.251E+00 | −3.680E+00 | 2.024E+00 |
| A | −2.157E−03 | −4.432E−03 | −4.799E−03 | 4.021E−04 |
| B | 0 | 3.055E−04 | 1.797E−04 | −4.327E−05 |
| C | 0 | 0 | −1.512E−05 | 0 |
| D | 0 | 0 | 5.706E−07 | 0 |

TABLE 3

| | S8 |
|---|---|
| C1 | −9.580E−04 |
| C2 | −3.751E−05 |

Figure 2:
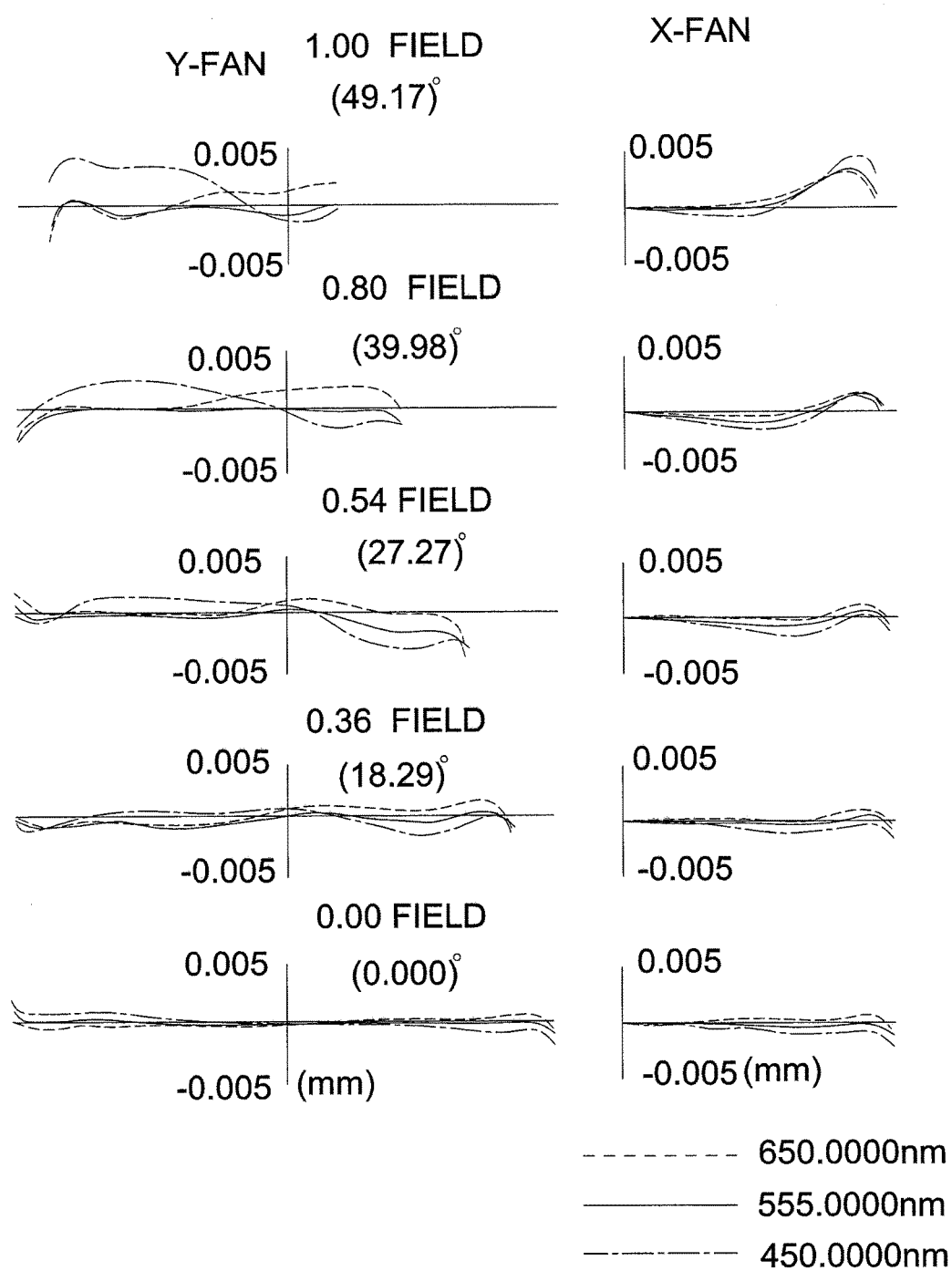
FIGS. 2, 3, 4 and 5 show optical simulation results of the optical lens shown in FIG. 1.
Figure 3:
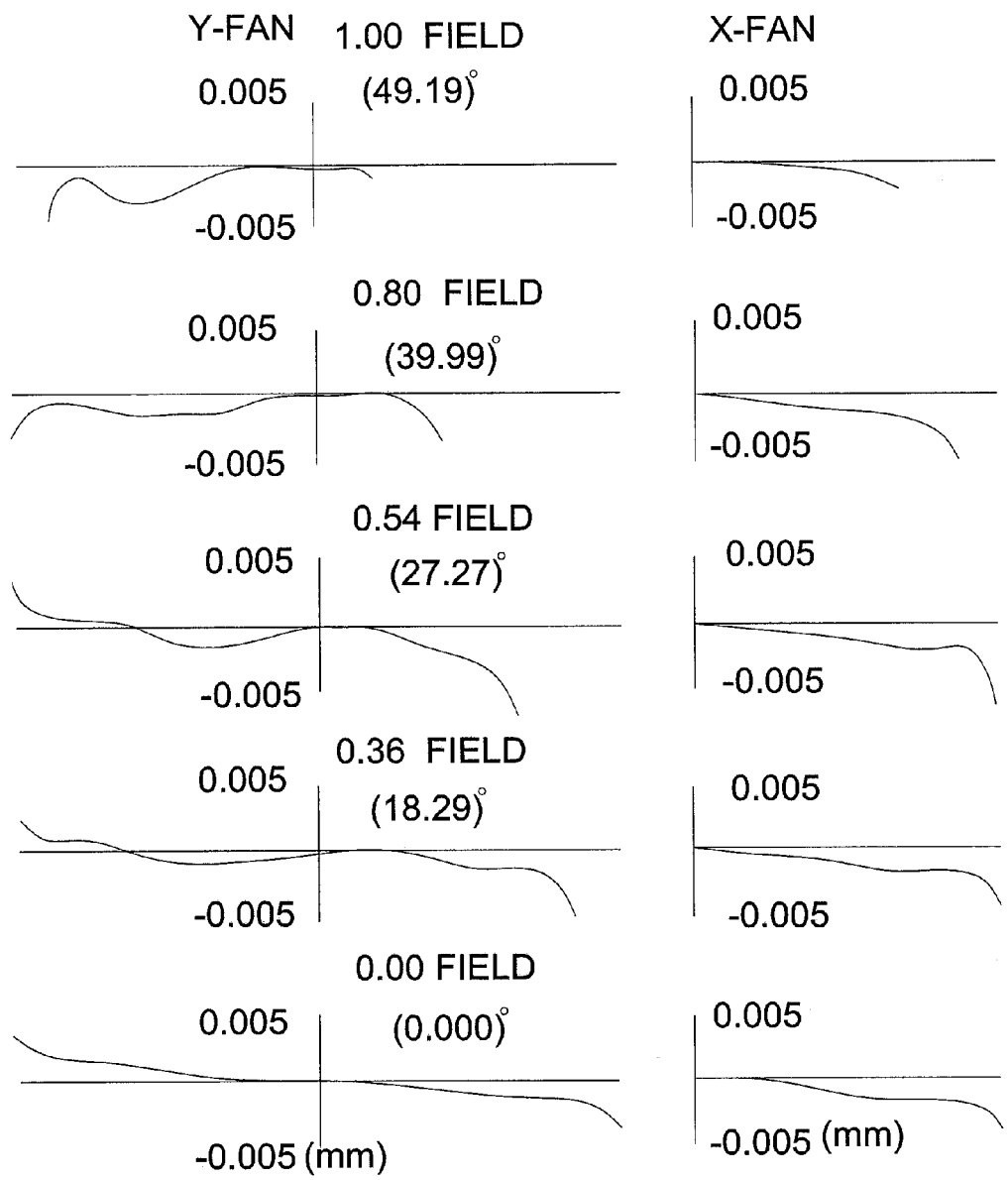
Figure 4:
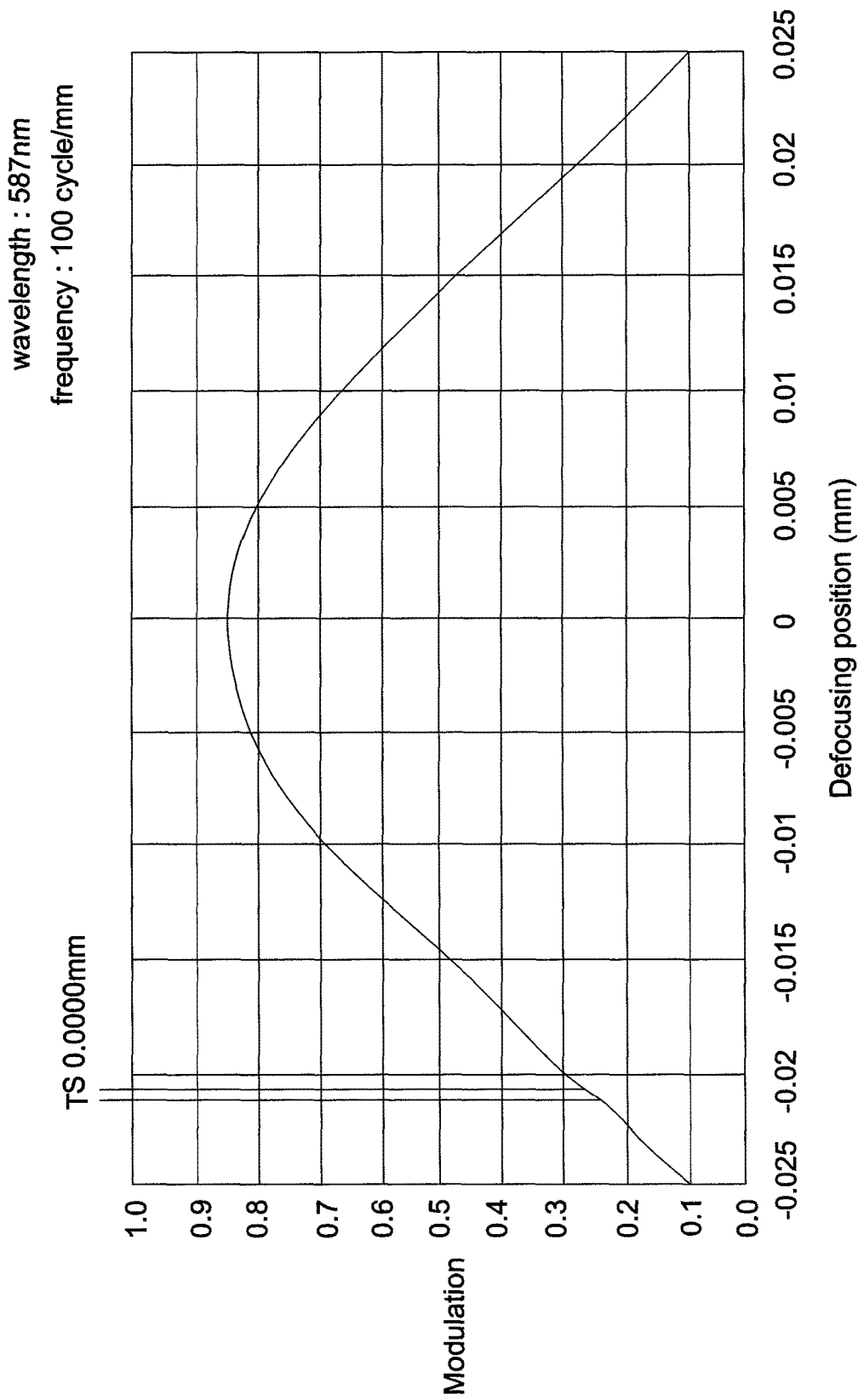
Figure 5:
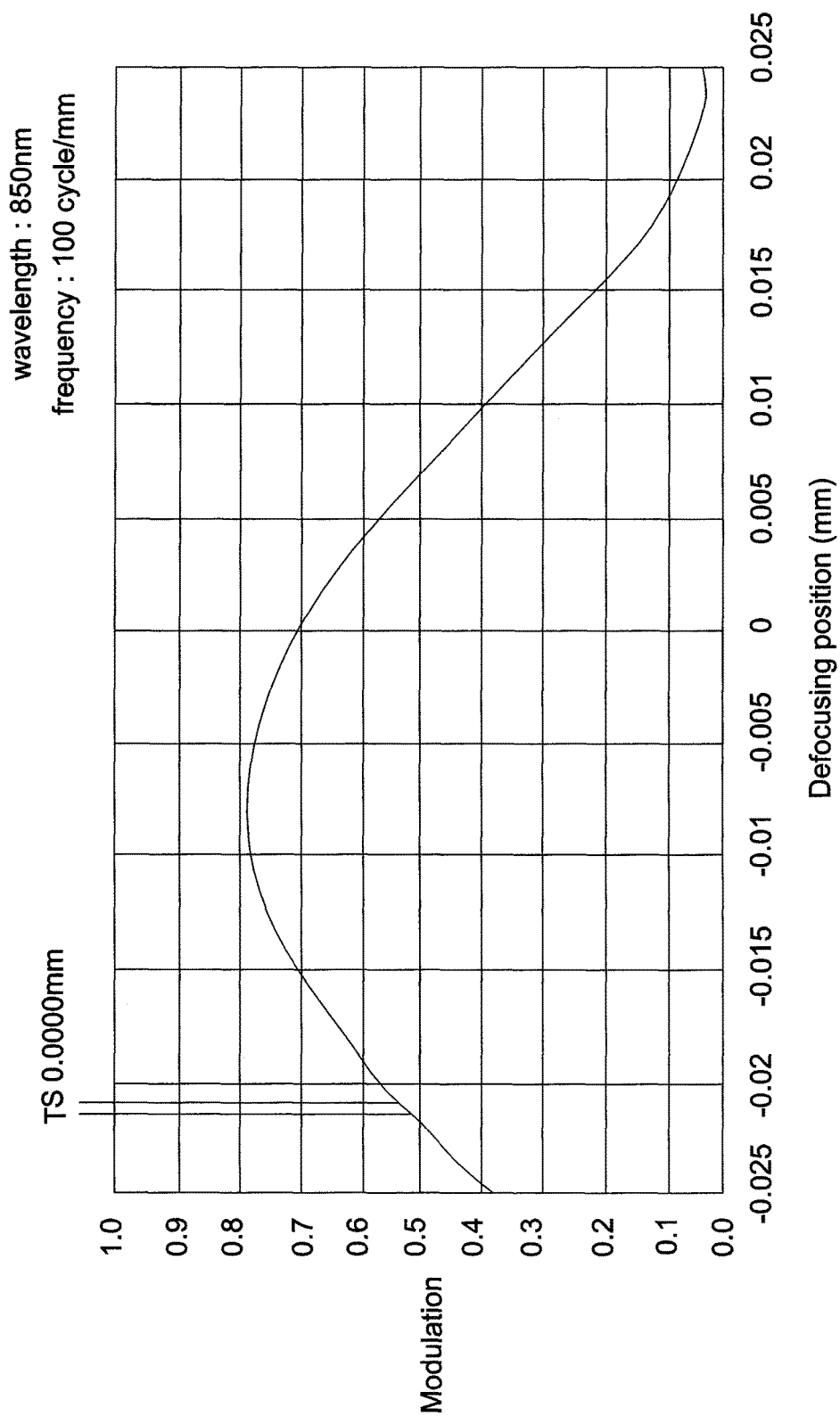

FIG. 2 and FIG. 3 are ray fan plots of the optical lens 10a respectively for visible light and 850 nm infrared light, where an abscissa of the plot represents entrance pupil positions, and an ordinate of the plot represents relative numerical values of positions on an image plane (such as the image plane 18) where main light beams are projected. FIGS. 4 and 5 show optical simulation results of the optical lens 10a. Specifically, FIG. 4 depicts a diffractive MTF curve for 587 nm green light, and FIG. 5 depicts a diffractive MTF curve for 850 nm infrared light. Comparing FIG. 4 with FIG. 5, it can be seen a focus shift is about 7 μm, where the focus shift is defined as a shift in a focal plane of 850 nm infrared light relative to a focal plane of 587 nm green light (standard focal plane) passing through the optical lens 10a. Note the diffractive MTF curve for green light may be depicted according to a wavelength of 555 nm other than 587 nm; that is, a focal plane of 555 nm green light may also serve as a standard focal plane. The simulated results shown in FIGS. 2-5 are within permitted ranges specified by the standard, which indicates the optical lens 10a according to the above embodiment may achieve good imaging quality and 24-hours confocal image-capturing capability.

In this embodiment, the optical lens 10a includes two lens groups and has an F number of 2.0, and the optical lens 10a has an aspheric lens with a diffractive optical surface to correct monochromatic and chromatic aberrations. Further, the optical lens 10a may satisfy the following conditions:

$$-2 < (\Phi d * V)/\Phi r < 0 \quad (3)$$

$$20 < V < 60 \quad (4)$$

$$|(0.5 * IMA)/(EFL * TAN(X)) - 1| < 0.3 \quad (5)$$

$$TTL/IMA < 3.3 \quad (6)$$

where $\Phi d$ denotes refractive power of a diffractive optical surface (S8) and equals C1/(−0.5) (Table 3 lists the value of C1), $\Phi r$ denotes refractive power of the aspheric lens L4, V denote an Abbe number of the aspheric lens L4, EFL denotes an effective focal length for visible light, IMA denotes a maximum image circle of an image plane formed at an effective focal length for visible light, X denotes half of a maximum field of view, and TTL denotes a total track length (distance between the surface S1 and the image plane 18 formed at the effective focal length for visible light). Specifically, in case an optical lens is designed to meet the condition of $(\Phi d*V)/\Phi r<-2$, it may indicate that the optical lens has large diffraction power and a diffractive micro structure with excessively amounts of circles to result in high fabrication complexities. Further, in case an optical lens is designed to meet the condition of $|(0.5*IMA)/(EFL*TAN(X))-1|>0.3$, image distortions of the image plane formed at an effective focal length for visible light become large. Besides, in case an optical lens is designed to meet the condition of TTL/IMA>3.3, the occupied space of the optical lens is comparatively large and thus unfavorable for miniaturization. Therefore, the optical lens 10a that satisfies the conditions (3), (4), (5) and (6) may achieve good imaging quality, low fabrication complexities, and 24-hours confocal image-capturing capability.

Figure 6:
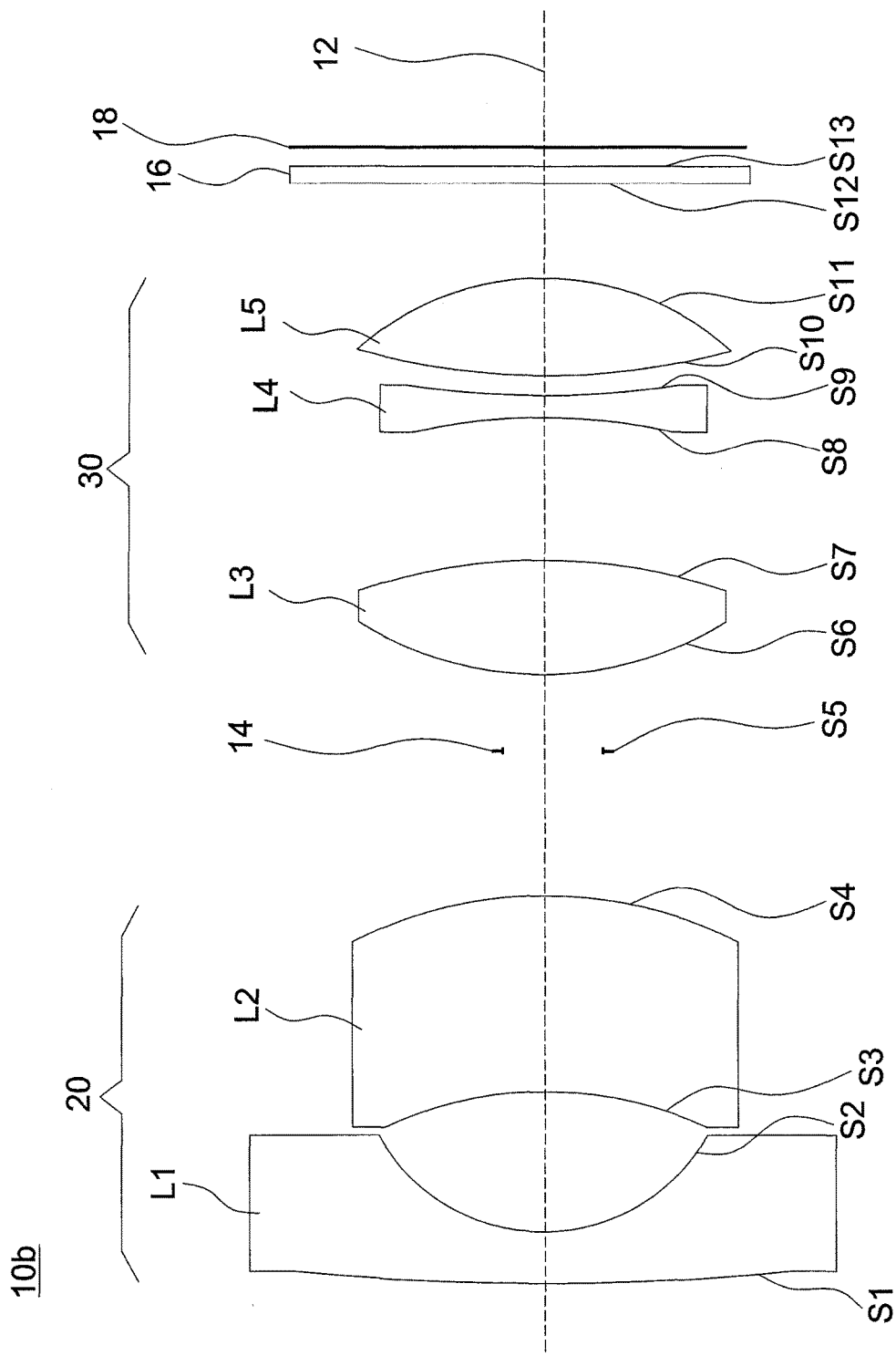
FIG. 6 shows a schematic diagram illustrating an optical lens according to another embodiment of the invention.

FIG. 6 shows a schematic diagram illustrating an optical lens 10b according to another embodiment of the invention. An optical lens 10b is disposed between a magnified side (such as an object side on the left of FIG. 6) and a minified side (such as an image side on the right of FIG. 6). As shown in FIG. 6, the optical lens 10b may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18 formed at an effective focal length (EFL) for visible light of the optical lens 10b. The cover glass 16 is disposed between the second lens group 30 and the image plane 18 for visible light. The first lens group 20 may include a first lens L1 and a second lens L2 arranged in order, along an optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to fifth lens L5 are negative, positive, positive, negative, positive. In this embodiment, the fifth lens L5 is an aspheric lens with a diffractive optical surface, the first lens L1, the second lens L2 and the fourth lens L4 are aspheric lenses, and the third lens L3 is a bi-convex lens. Further, the first lens L1 to the fifth lens L5 are separate from each other. In an alternate embodiment, adjoining surfaces respectively on adjacent lenses may have an identical radius of curvature and may be joined together to form a cemented lens, but the invention is not limited thereto. The detailed optical data of the optical lens 10b such as lens parameters, shape, aspheric coefficients and diffractive coefficients are shown in Tables 4-6 below. Parameters A-D shown in Table 2 are 4th, 6th, 8th and 10th order aspheric coefficients (shown in equation 1). Parameters C1 and C2 shown in Table 3 are 2th and 4th order coefficients of the diffractive optical surface polynomial (shown in equation 2).

TABLE 4

| Surface | Radius (mm) | Thickness (mm) | Refractive index | Abbe number | Object description |
|---|---|---|---|---|---|
| S1 | −56.344 | 0.812 | 1.53 | 55.75 | L1(aspheric) |
| S2 | 3.115 | 2.286 | | | |
| S3 | −8.348 | 3.334 | 1.64 | 23.97 | L2(aspheric) |
| S4 | −6.844 | 2.409 | | | |
| S5 | ∞ | 1.313 | | | aperture stop |
| S6 | 5.359 | 1.913 | 1.44 | 94.95 | L3(biconvex) |
| S7 | −9.623 | 2.470 | | | |
| S8 | −12.556 | 0.300 | 1.64 | 23.97 | L4(aspheric) |
| S9 | 8.089 | 0.377 | | | |
| S10 | 6.837 | 1.635 | 1.53 | 55.75 | L5(aspheric) |
| S11 | −5.959 | 5.992 | | | |
| S12 | ∞ | 0.610 | 1.52 | 64.17 | cover glass |
| S13 | ∞ | 0.045 | | | |
| | ∞ | | | | image plane |

Effective focal length (EFL) for visible light = 3.883 mm
Effective focal length (EFL) for NIR 850 nm light = 3.876 mm
F-Number = 2.0
Maximum field of view (FOV) = 104.9 degrees
Maximum image circle (IMA) of the visible light image plane = 7.54 mm
Total track length TTL (distance between the surface S1 and the image plane = 23.5 mm.

In the above Table 4, a thickness of the surface S1 is a distance between the surface S1 and the surface S2 along the optical axis 12, a thickness of the surface S2 is a distance between the surface S2 and the surface S3 along the optical axis 12, and a thickness of the surface S13 is a distance between the surface S13 of the cover glass 16 and the image plane 18 along the optical axis 12.

TABLE 5

| | S1 | S2 | S3 | S4 |
|---|---|---|---|---|
| K | 0 | 0 | 0 | 0 |
| A | 1.658E−03 | −6.320E−04 | −2.464E−03 | −3.682E−04 |
| B | −7.884E−05 | −8.546E−05 | 4.376E−05 | 1.835E−05 |
| C | 3.126E−06 | −5.632E−06 | −6.879E−06 | 3.135E−06 |
| D | −5.407E−08 | −1.236E−06 | 1.078E−06 | −1.587E−07 |

| | S8 | S9 | S10 | S11 |
|---|---|---|---|---|
| K | 1.692E+01 | −7.793E+00 | −4.575E+00 | 2.006E+00 |
| A | −3.103E−03 | −3.109E−03 | −4.439E−03 | −3.899E−04 |
| B | 0 | 4.067E−04 | 2.971E−04 | −1.406E−05 |
| C | 0 | 0 | −1.504E−05 | 0 |
| D | 0 | 0 | 7.472E−07 | 0 |

TABLE 6

| | S11 |
|---|---|
| C1 | −1.048E−03 |
| C2 | 4.038E−06 |

Figure 7:
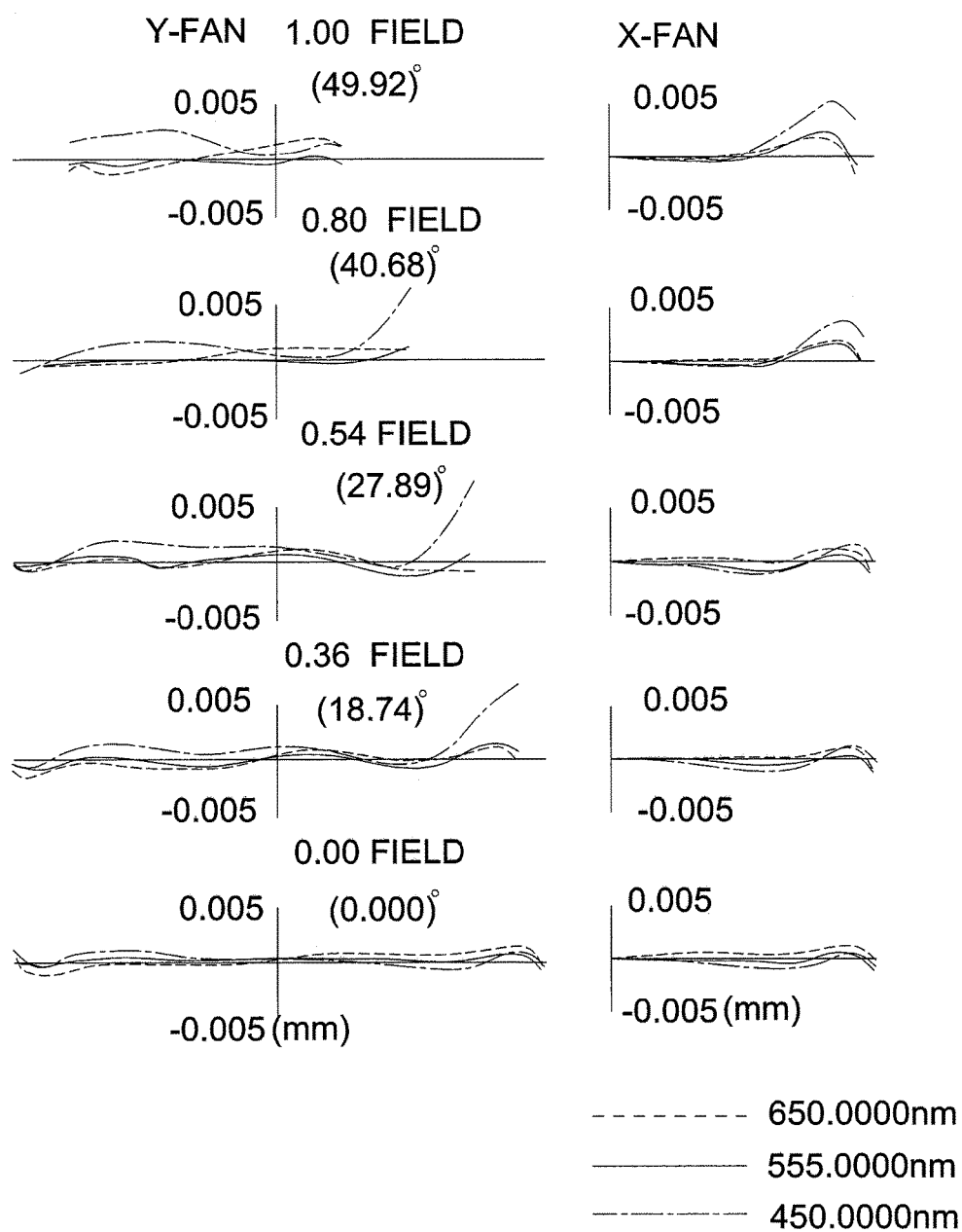
FIGS. 7, 8, 9 and 10 show optical simulation results of the optical lens shown in FIG. 6.
Figure 8:
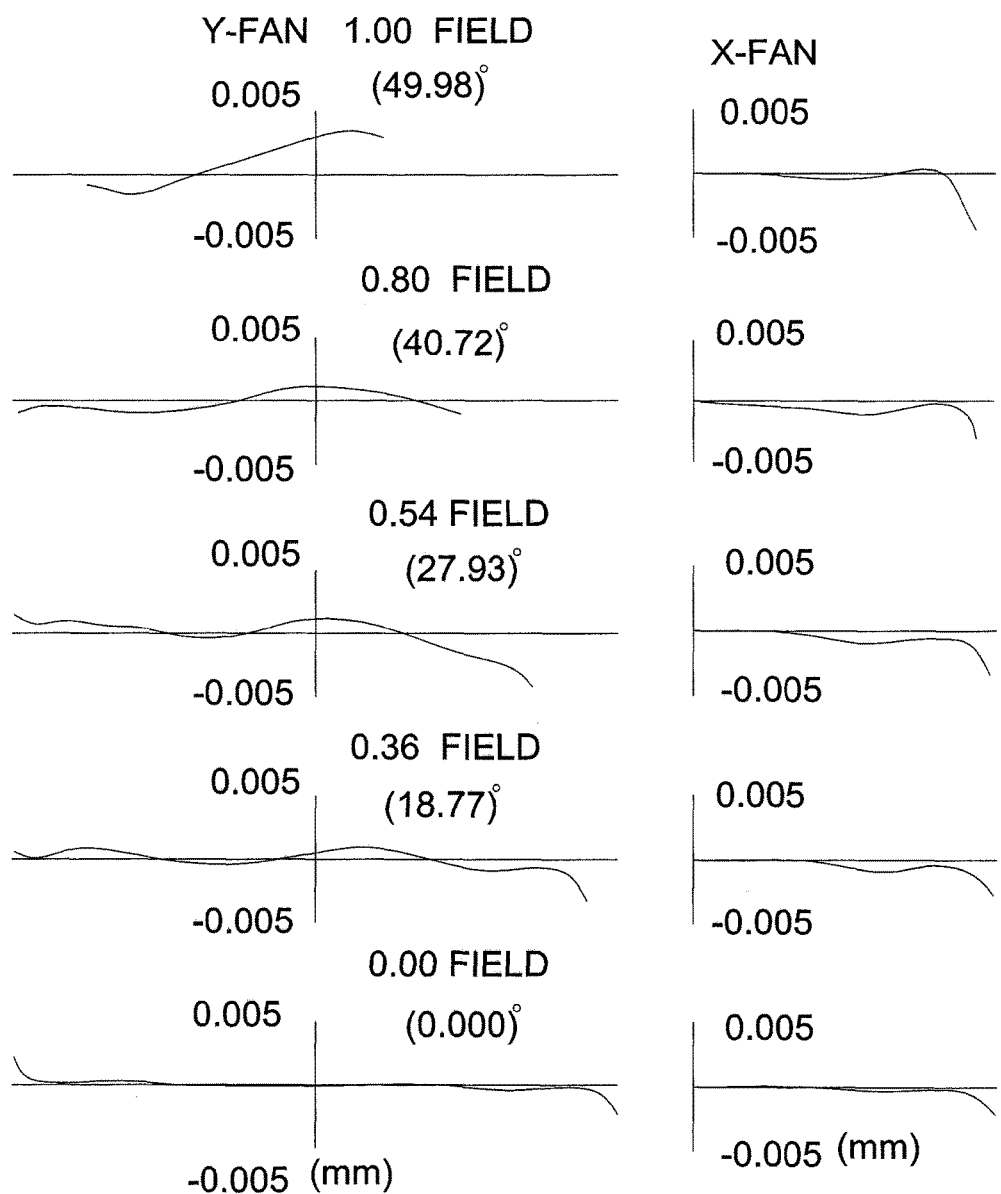
Figure 9:
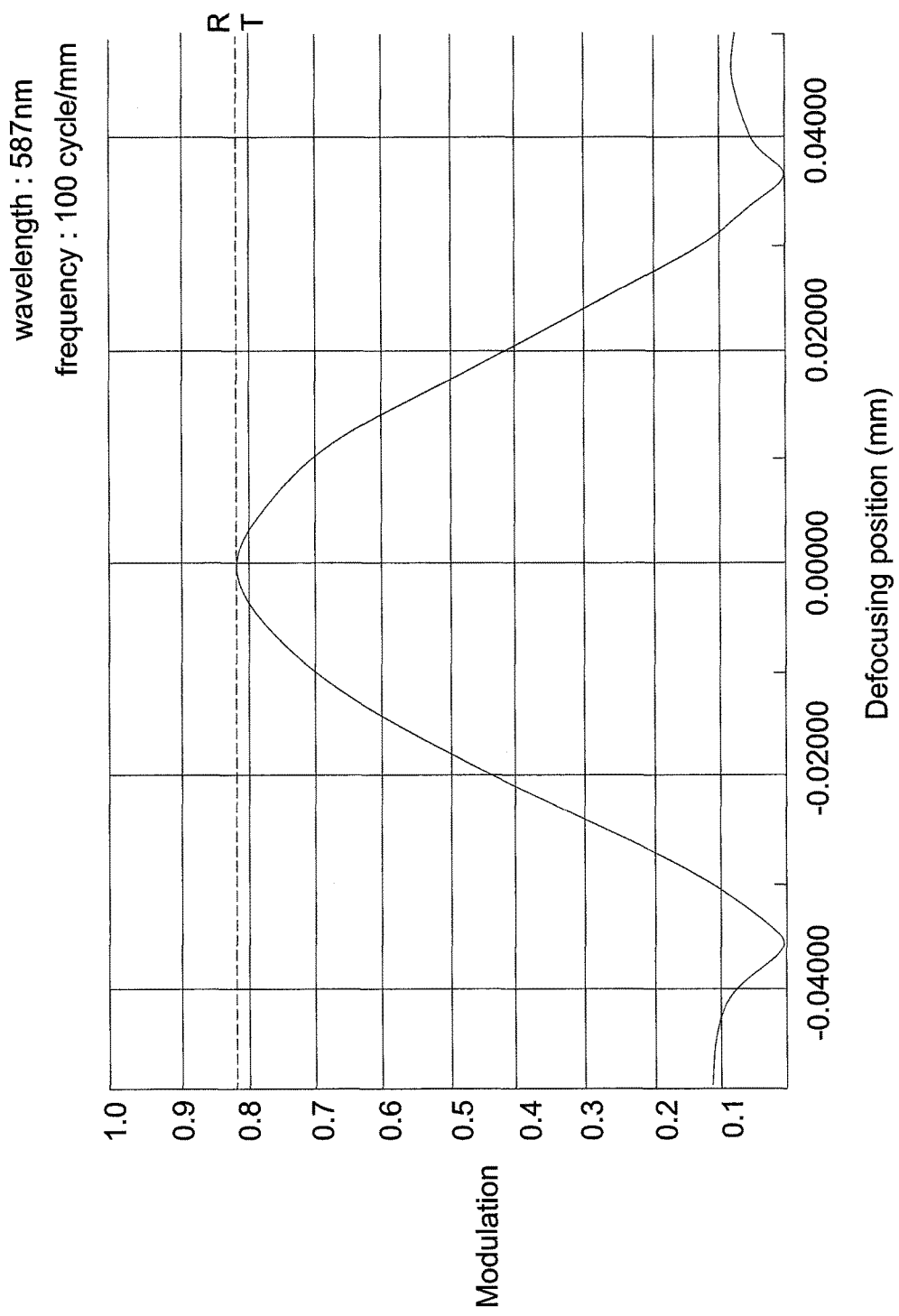
Figure 10:
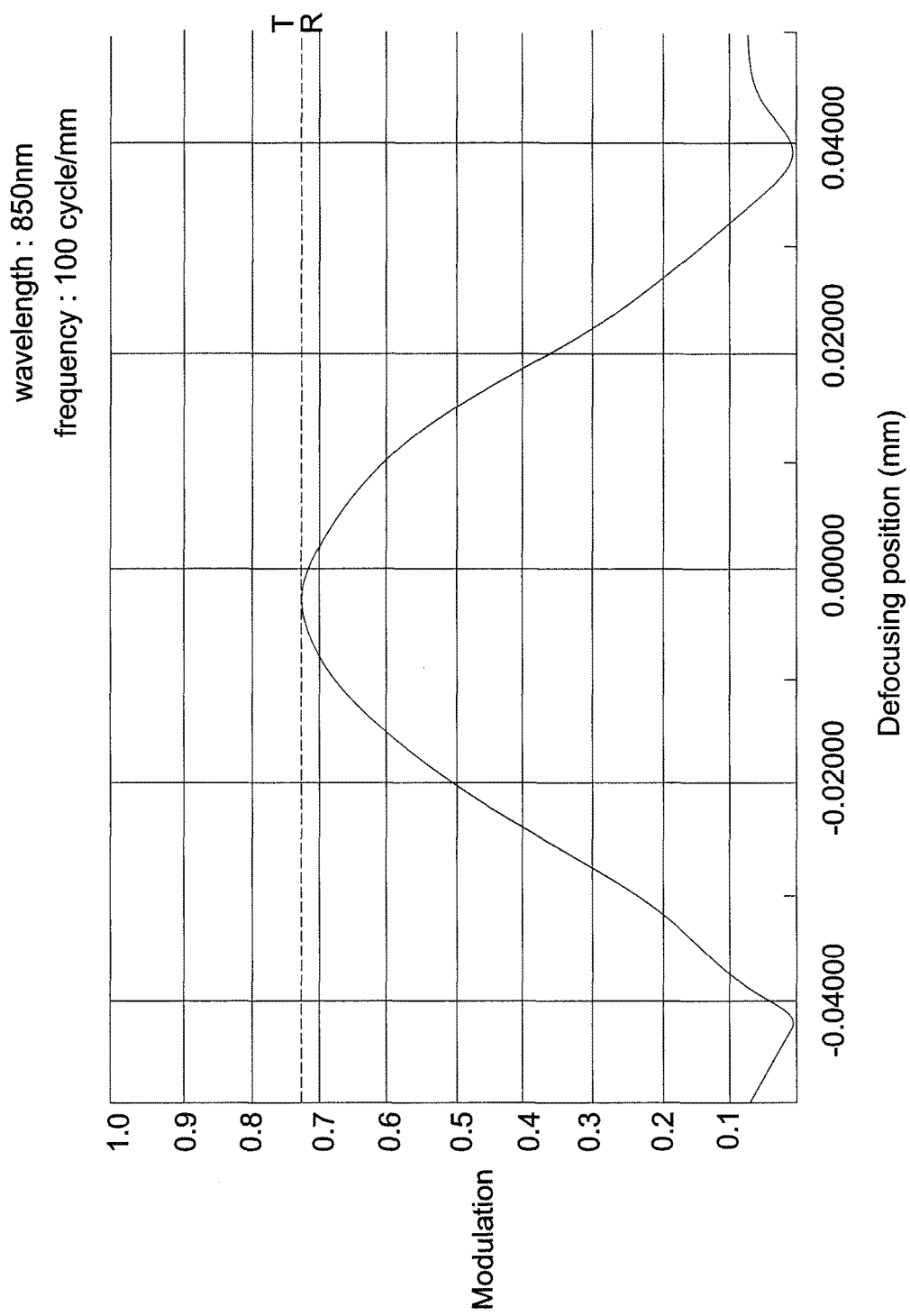

FIG. 7 and FIG. 8 are ray fan plots of the optical lens 10b respectively for visible light and 850 nm infrared light, where an abscissa of the plot represents entrance pupil positions, and an ordinate of the plot represents relative numerical values of positions on an image plane (such as the image plane 18) where main light beams are projected. FIGS. 9 and 10 show optical simulation results of the optical lens 10b. Specifically, FIG. 9 depicts a diffractive MTF curve for 587 nm green light, and FIG. 10 depicts a diffractive MTF curve for 850 nm infrared light. Comparing FIG. 9 with FIG. 10, it can be seen a focus shift is about 1 μm, where the focus shift is defined as a shift in a focal plane of 850 nm infrared light relative to a focal plane of 587 nm green light (standard focal plane) passing through the optical lens 10*b*. Note the diffractive MTF curve for green light may be depicted according to a wavelength of 555 nm other than 587 nm; that is, a focal plane of 555 nm green light may also serve as a standard focal plane. The simulated results shown in FIGS. 7-10 are within permitted ranges specified by the standard, which indicates the optical lens 10*b* according to the above embodiment may achieve good imaging quality and 24-hours confocal image-capturing capability.

In this embodiment, the optical lens 10*b* includes two lens groups and has an F number of 2.0, and the optical lens 10*b* has an aspheric lens with a diffractive optical surface to correct monochromatic and chromatic aberrations. Further, the optical lens 10*b* may satisfy the following conditions:

$$0 < (\Phi d * V)/\Phi r < 2 \quad (7)$$

$$20 < V < 60 \quad (4)$$

$$|(0.5 * IMA)/(EFL * TAN(X)) - 1| < 0.3 \quad (5)$$

$$TTL/IMA < 3.3 \quad (6)$$

where $\Phi d$ denotes refractive power of a diffractive optical surface (S11) and equals C1/(−0.5) (Table 6 lists the value of C1), $\Phi r$ denotes refractive power of the aspheric lens L5, V denote an Abbe number of the aspheric lens L5, EFL denotes an effective focal length for visible light, IMA denotes a maximum image circle of an image plane formed at an effective focal length for visible light, X denotes half of a maximum field of view, and TTL denotes a total track length (distance between the surface S1 and the image plane 18 formed at the effective focal length for visible light. Specifically, in case an optical lens is designed to meet the condition of $(\Phi d * V)/\Phi r > 2$, it may indicate that the optical lens has large diffraction power and a diffractive micro structure with excessively amounts of circles to result in high fabrication complexities. Further, in case an optical lens is designed to meet the condition of $|(0.5*IMA)/(EFL*TAN(X))-1| > 0.3$, image distortions of the image plane formed at an effective focal length for visible light become large. Besides, in case an optical lens is designed to meet the condition of TTL/IMA>3.3, the occupied space of the optical lens is comparatively large and thus unfavorable for miniaturization. Therefore, the optical lens 10*b* that satisfies the conditions (4), (5), (6) and (7) may achieve good imaging quality, low fabrication complexities, and 24-hours confocal image-capturing capability.

According to the above embodiments, the optical lens 10*a* and 10*b* may achieve lighter weight, lower fabrication costs, good imaging quality and 24-hours confocal image-capturing capability. Further, according to the above embodiments, a field of view of the optical lens may reach a range of 80-110 degrees.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
   a first lens group with negative refractive power and a second lens group with positive refractive power, a number of lenses with refractive power of the first lens group being smaller than three, and a number of lenses with refractive power of the second lens group being smaller than five; and
   an aperture stop disposed between the first lens group and the second lens group, wherein the second lens group has a lens with a diffractive optical surface, and the lens with a diffractive optical surface satisfies the condition:

$$0 < |(\Phi d * V)/\Phi r| < 2$$

where $\Phi d$ denotes refractive power of the diffractive optical surface, $\Phi r$ denotes refractive power of the lens with the diffractive optical surface, and V denotes an Abbe number of the lens with the diffractive optical surface.

2. The optical lens as claimed in claim 1, wherein the lens with a diffractive optical surface satisfies the condition:

$$20 < V < 60.$$

3. The optical lens as claimed in claim 1, wherein the first lens group comprises an aspheric lens with positive refractive power and an aspheric lens with negative refractive power.

4. The optical lens as claimed in claim 1, wherein the lens with a diffractive optical surface is an aspheric lens.

5. The optical lens as claimed in claim 1, wherein a lens of the second lens group nearest the aperture stop is a spherical lens.

6. The optical lens as claimed in claim 5, wherein the spherical lens satisfies the condition:

$$V > 70,$$

where V denotes an Abbe number of the spherical lens.

7. The optical lens as claimed in claim 1, wherein a focus shift of the optical lens is smaller than 8 μm, where the focus shift is defined as a shift in a focal plane of 850 nm infrared light relative to a standard focal plane, and the standard focal plane is a focal plane of 555 nm or 587 nm green light passing through the optical lens.

8. An optical lens, comprising:
   a first lens group with negative refractive power and comprising two lenses with refractive power,
   a second lens group with positive refractive power and comprising three lenses with refractive power, one of the three lenses having a diffractive optical surface, and the first lens group and the second lens group being arranged in order from a magnified side to a minified side; and
   an aperture stop disposed between the first lens group and the second lens group, wherein the optical lens satisfies the condition:

$|(0.5*IMA)/(EFL*TAN(X))-1|<0.3$ where EFL denotes an effective focal length for visible light, IMA denotes a maximum image circle of an image plane formed at an effective focal length for visible light, and X denotes half of a maximum field of view.

9. The optical lens as claimed in claim 8, wherein the lens having a diffractive optical surface satisfies the condition:

$20<V<60$, where V denotes an Abbe number of the lens.

10. The optical lens as claimed in claim 8, wherein the second lens group comprises an aspheric lens with positive refractive power and an aspheric lens with negative refractive power.

11. The optical lens as claimed in claim 8, wherein the lens having a diffractive optical surface is an aspheric lens.

12. The optical lens as claimed in claim 8, wherein a lens of the second lens group nearest the aperture stop is a spherical lens.

13. The optical lens as claimed in claim 12, wherein the spherical lens satisfies the condition:

$V>70$, where V denotes an Abbe number of the spherical lens.

14. The optical lens as claimed in claim 8, wherein a focus shift of the optical lens is smaller than 8 µm, where the focus shift is defined as a shift in a focal plane of 850 nm infrared light relative to a standard focal plane, and the standard focal plane is a focal plane of 555 nm or 587 nm green light passing through the optical lens.

15. An optical lens, comprising:
    a first lens group with negative refractive power, a number of lenses with refractive power of the first lens group being smaller than three;
    a second lens group with positive refractive power, a number of lenses with refractive power of the second lens group being smaller than five, and the second lens group having a lens with a diffractive optical surface; and
    an aperture stop disposed between the first lens group and the second lens group, wherein the optical lens satisfies the condition:

$TTL/IMA<3.3$ where TTL denotes a total track length of the optical lens, and IMA denotes a maximum image circle of an image plane formed at an effective focal length for visible light.

16. The optical lens as claimed in claim 15, wherein the lens with a diffractive optical surface satisfies the condition:

$20<V<60$, where V denotes an Abbe number of the lens.

17. The optical lens as claimed in claim 15, wherein the first lens group comprises an aspheric lens with positive refractive power and an aspheric lens with negative refractive power, and the second lens group comprises an aspheric lens with positive refractive power and an aspheric lens with negative refractive power.

18. The optical lens as claimed in claim 15, wherein the lens with a diffractive optical surface is an aspheric lens.

19. The optical lens as claimed in claim 15, wherein a lens of the second lens group nearest the aperture stop is a spherical lens, and the spherical lens satisfies the condition:

$V>70$, where V denotes an Abbe number of the spherical lens.

20. The optical lens as claimed in claim 15, wherein a focus shift of the optical lens is smaller than 8 µm, where the focus shift is defined as a shift in a focal plane of 850 nm infrared light relative to a standard focal plane, and the standard focal plane is a focal plane of 555 nm or 587 nm green light passing through the optical lens.

* * * * *